United States Patent [19]

Yoda

[11] Patent Number: 5,515,268
[45] Date of Patent: May 7, 1996

[54] METHOD OF AND SYSTEM FOR ORDERING PRODUCTS

[75] Inventor: Kiyoshi Yoda, Hyogo, Japan

[73] Assignee: Mitsubishi Denki Kabushiki Kaisha, Tokyo, Japan

[21] Appl. No.: 118,275

[22] Filed: Sep. 9, 1993

[30] Foreign Application Priority Data

Sep. 9, 1992 [JP] Japan .................................. 4-265623

[51] Int. Cl.$^6$ .................................................. G06F 17/60
[52] U.S. Cl. .......................................... 364/401; 364/556
[58] Field of Search ................................... 364/401, 403, 364/400, 556, 560, 562, 563; 382/47; 395/135, 139; 235/383, 385

[56] References Cited

U.S. PATENT DOCUMENTS

| | | |
|---|---|---|
| 3,688,676 | 9/1972 | Cruickshank . |
| 3,690,242 | 9/1972 | Cruickshank . |
| 3,796,129 | 3/1974 | Cruickshank . |
| 3,902,182 | 8/1975 | Hillborg . |
| 3,923,370 | 12/1975 | Mostrom . |
| 4,149,246 | 4/1979 | Goldman .................................. 364/200 |
| 4,261,012 | 4/1981 | Maloomian . |
| 4,418,993 | 12/1983 | Lipton . |
| 4,472,037 | 9/1984 | Lipton . |
| 4,523,226 | 6/1985 | Lipton et al. . |
| 4,538,353 | 9/1985 | Gardner . |
| 4,562,463 | 12/1985 | Lipton . |
| 4,583,117 | 4/1986 | Lipton et al. . |
| 4,598,376 | 7/1986 | Burton et al. .......................... 364/470 |
| 4,604,807 | 8/1986 | Bock et al. . |
| 4,635,367 | 1/1987 | Vigede . |
| 4,670,781 | 6/1987 | Aubert et al. . |
| 4,730,260 | 3/1988 | Mori et al. . |
| 4,731,743 | 3/1988 | Blancato . |
| 4,792,850 | 12/1988 | Liptoh et al. . |
| 4,845,641 | 7/1989 | Ninomiya et al. . |
| 4,846,577 | 7/1989 | Grindon .................................. 356/376 |
| 4,871,256 | 10/1989 | Grindon .................................. 356/376 |
| 4,884,876 | 12/1989 | Lipton et al. . |
| 4,885,844 | 12/1989 | Chun . |
| 4,912,663 | 3/1990 | Joy et al. ................................. 364/560 |
| 4,967,268 | 10/1990 | Lipton et al. . |
| 5,023,904 | 6/1991 | Kaplan et al. .............................. 379/91 |
| 5,060,171 | 10/1991 | Steir et al. . |
| 5,063,441 | 11/1991 | Lipton et al. . |
| 5,130,794 | 7/1992 | Ritchey . |
| 5,163,006 | 11/1992 | Deziel ..................................... 364/470 |
| 5,163,007 | 11/1992 | Slilaty ..................................... 364/470 |
| 5,189,663 | 2/1993 | Williams .................................. 370/17 |
| 5,195,030 | 3/1993 | White ...................................... 364/401 |
| 5,206,804 | 4/1993 | Thies et al. .............................. 364/401 |
| 5,216,594 | 6/1993 | White et al. ............................. 364/403 |
| 5,216,817 | 6/1993 | Misevich et al. . |
| 5,280,570 | 1/1994 | Jordan .................................... 364/400 |

OTHER PUBLICATIONS

S. Tachi et al., "Tele–existence (I): Design and Evaluation of a Visual Display with Sensation of Presence", Proceedings of the 5th International Symposium on Theory and Practice of Robots and Manipulators, 1984, pp. 245–254.

Michael W. Vannier, et al. "Facial Surface Scanner", IEEE Computer Graphics and Applications, Nov. 1991, pp. 72–79.

Catalogue of "OGIS Range Finder, RFX IV" (no translation—Japanese).

The Institute "Multimedia Framework Said To Merit Government Support", The Institute of Electrical and Electronics Engineers, Inc., vol. 17, No. 4, Jul./Aug. 1993, p. 1.

Business Week, "Retailing Will Never Be The Same", McGraw–Hill publication, Jul. 26, 1993, pp. 54–60.

Primary Examiner—Robert A. Weinhardt
Assistant Examiner—Jennifer H. Dixon
Attorney, Agent, or Firm—Lowe, Price, Leblanc & Becker

[57] ABSTRACT

In ordering products, a customer selects a product from a product list stored in a remote computer system via a communication line. A sensor detects the customer size information and transmits it to the remote computer, thus enabling the remote computer to select a product having an appropriate size. Subsequently, on a monitor display, product image is superimposed on the customer body image. The fit evaluation is automatically performed by the local computer system. Depending on the fit of the product, the customer tries different products until placing an order.

27 Claims, 13 Drawing Sheets

METHOD OF AND SYSTEM FOR ORDERING PRODUCTS

TECHNICAL FIELD

The present invention relates generally to ordering of products, and more particularly, to a method of and system for ordering of products including transmission of data corresponding to measured physical attributes of products such as size and fit.

BACKGROUND ART

Telephone ordering services available today are the commonly known type wherein a customer can place a call to a remote vendor and order a given product by a product code. However, the call is received by the vendor either through an operator or a computer, through which the particulars of the product codes, credit card identification, mailing address and the like are communicated. Such services are presently available for ordering of merchandise such as those normally found in department stores, and more recently, even in grocery stores. In addition, many computer communication services using telephone lines have been commercially available (for example, CompuServe), thereby enabling us to order many products such as books, computer hardware, and software through the communication services. A typical telephone ordering service is described in detail in U.S. Pat. No. 5,023,904, the disclosure of which is hereby incorporated by reference.

The foregoing ordering system includes many drawbacks. One of the more obvious ones is that it is difficult for a customer to buy clothes, shoes, or other products which must fit his/her body size. In such a case, many customers avoid telephone ordering and directly visit department stores or any particular shops so as not to encounter such size problems.

DISCLOSURE OF THE INVENTION

One object of the invention is to provide an efficient ordering method and system for products that accommodate varying customer sizes.

Another object of the invention is to provide an ordering method and system to enable a vendor or a manufacturer to accept a direct order while leaving their products in a warehouse or a storehouse; in other words, the vendor does not have to locate the products in a shop or a department store.

The above and other objects of the invention are satisfied, at least in part, by providing, a remote computer system at a remote vendor site and a local computer system at a customer site, both of which are mutually connected through a communication line in order to exchange customer's body size information and product size information between the customer and the remote computer.

The remote computer system comprises a communication device coupled to the communication line, a storage device including a data base of all the products information such as size, price, and color information, and a processor for controlling the whole remote computer system.

The local computer system comprises a communication device coupled to the communication line, a sensor device for detecting the customer's body size information, an output device at least for transferring the products information to the customer, an input device for inputting customer and product related information, and a processor for controlling the whole local computer system. In addition, the remote computer selects several possible products having different sizes or other features with the aid of the data base having various previous data that include customer body size and corresponding purchased product size.

In accordance with a preferred embodiment of the invention, in addition to the above, the size information of the product is transferred to an output device in the local computer system. Preferably, the output device is a monitor display that also shows the customer's body image, whereas the product image is superimposed onto the customer body image on the monitor display in such a way that the customer can view the fit of the product. Alternatively or in addition, the local computer can automatically show any kind of alarm information either visually or audibly if the product is not of a suitable size. This may be achieved by executing an evaluation program stored in the processor. The monitor display can be an ordinary display or a stereoscopic display such as a head mounted display. The communication line is preferably integrated services digital networks (ISDN) using optical fibers. The sensor unit can be a three-dimensional shape sensor or digitizer using optics.

According to one aspect of the invention, the local computer system transfers the product size information directly to the customer body via art actuator attached on the body, so that the customer can feel the fit of the product. The local computer can teach the product size information to the customer, wherein the actuator operates until the body size detected by the actuator unit equals the product dimension. This is particularly useful for selecting one of two products of slightly different size.

According to another aspect of the invention, every operation can be achieved in the local computer system in a vendor site, wherein all the functions of the remote computer system are performed in the local computer.

In accordance with the method of this invention, the following steps are carried out. At a local computer system where a customer is located, the method provides:

(a) selecting a product species from a product list transmitted by a remote computer system;

(b) selecting a product from said selected product species;

(c) transmitting customer information using a sensor means toward a remote computer system to request selecting one or more size of said product;

(d) transferring an appropriate product information to an output device;

(e) evaluating the product fit;

(f) placing an order; and the following additional steps are performed at a remote computer system:

(g) responding to customer's product species request and sending various product information back to the customer;

(h) selecting one or more size of said product and transferring this information to the local computer system; and (i) accepting said order.

These steps are executed either the local or the remote computer by way of exchanging information via the communication line. Details will be described later.

In accordance with a preferred embodiment of the invention, in the step (d), the local computer system transfers the products size information to a display monitor as an output device, so that the customer can view the fit of the product. Automatic evaluation can be performed by the local computer in the step (e). This is based on comparison of each dimension between the body size and the product size. Alternatively, the customer can check the fit by viewing the display monitor, whereon both product image and the customer body image are demonstrated in a three-dimensional way.

According to one aspect of the invention, in the step (d), the local computer system transfers the product size information directly to the customer body via an actuator, as another output device, attached on the body, so that the customer can feel the fit of the product.

According to another aspect of the invention, all the steps (a) through (i) can be executed in the local computer in a vendor site, wherein the local computer performs all the functions.

The invention accordingly enables a customer to place an order of a product without visiting a department store or a shop. Alternatively, if the local computer system is located in a local shop or store, the shop owner does not have to have all the products in his/her shop. Instead, those products can be in a warehouse or a storehouse, and whenever needed appropriate products can be sent to customers without displaying in the shop.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of modifications in various obvious respects, all without departing from the invention. Consequently, the drawing and description are to be regarded as illustrative in nature, and not as restrictive.

BEST MODE FOR PRACTICING THE INVENTION

The invention is based in part on the realization that customers' body size information and product size information can be exchanged through a communication line with extensive use of a computer and a shape sensor. This feature enables a customer at home to place an order for such size-sensitive products without visiting a department store or a shop. The feature also enables a vendor not to place all the products in a shop; in other words, the vendor can store the products in a warehouse or a storehouse and can accept direct orders from the customers. Furthermore, even the manufacturer can accept direct orders from customers without intermediate distributors or vendors. For simplicity, vendors mean distributors, resellers, manufacturers and likes hereinafter.

Figure 1:
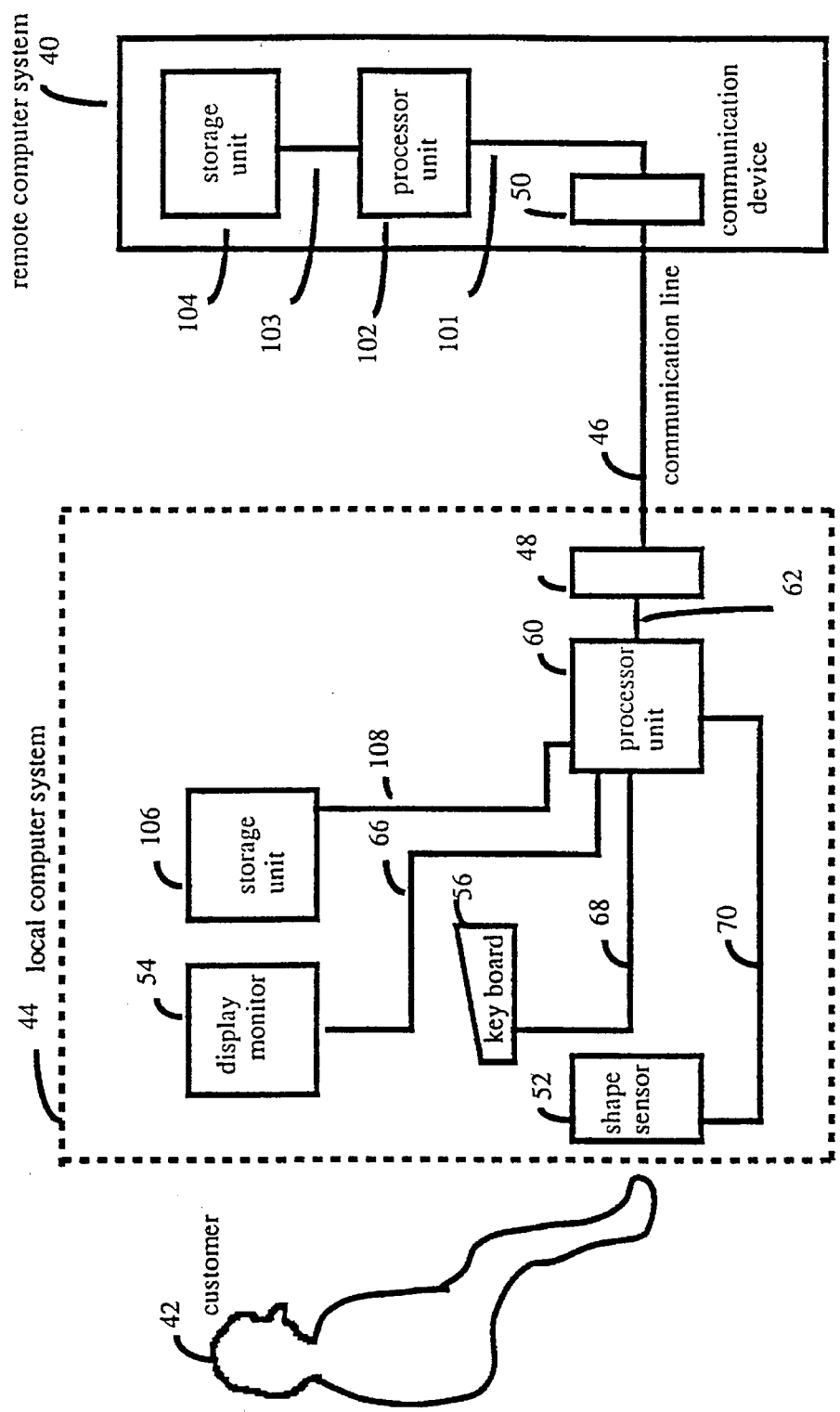
FIG. 1 is a block diagram illustrating the ordering system in accordance with the present invention, wherein a display monitor is used for informing a remote product image along with a customer body image.

Reference is made to FIG. 1, wherein a remote computer system 40 at a remote vendor with a communication line 46 which connects remote computer system 40 and a local computer system 44 in order to exchange customer and product information including size information between a customer 42 and remote computer 40 at a vendor site.

The local computer system 44 comprises a communication device 48 coupled to communication line 46 for exchanging the information, a shape sensor 52 for detecting the customer's size information, a display monitor 54 on which the customer body image and the product image are displayed, a keyboard 56 for inputting product related and customer related information, a storage unit 106 for storing at least customer information, and a processor unit 60 that is connected to shape sensor 52, display monitor 54, key board 56, storage unit 106 and communication device 48 via connection lines 70, 66, 68, 108 and 62, respectively; and thus controls the whole local computer system 44. Elements 48, 56, 60 and 106 are conventional; 52 will be described in detail later. The processor unit 60 executes a program that includes a fit evaluation routine, the step (e) in FIG. 6. Operation of a typical evaluation routine will be described in detail later using FIGS. 7, 8, and 9.

The remote computer system 40, on the other hand, comprises a conventional communication device 50 coupled to the communication line 46; a conventional storage unit 104 storing, in accordance with this invention, a data base of all the product information such as size, price, color and body size information corresponding to each purchase or preference of previous customers possibly including the present customer 42; and a conventional processor unit 102 for controlling whole remote computer system 40 through interface cables 101 and 103. Therefore, remote computer 40 can select one or more size of products with the aid of the data base after receiving size information of current customer 42. Previous customer's selection versus his/her body size information may be used for offering a best fit. In other words, the processor 102 may try to find nearly the same body size in the data base, and offer a best possible size. Alternatively, each product can be tried on by many people or volunteers in the vendor site, and a data base may be created for later use. That is to say, computer 40 or 44 may learn previous preferred combination between the previously purchased or selected product size and the previous customer body size, and when needed the computer 40 or 44 may refer to the data base stored in storage unit 104. If customer 42 previously bought products using this ordering system, the data base contains the customer's body size and other information including his/her preferences such as preferred color and design. Thus the data base may provide quicker and better services to each customer who frequently uses the ordering system. Storing customer's preferences in a computer for later better service has already conducted in a large hotel chain, such as Hyatt Hotels and Westin Hotels, wherein the preferences include smoking or non-smoking room selection.

The shape measurement is performed either on-line or off-line. For example, customer 42 can visit a local shop where the local computer system 44 is installed. Occasionally he/she visits the shop so that computer 44 or 40 renews the customer size information. This is called off-line measurement. In this case, the customer's size information is stored in storage unit 106 or 104 such as a hard disk or a magnetic tape unit. Alternatively, customer 42 can own a data storage card, such as an LSI card, containing at least his/her body size information which can be periodically revised. On-line measurement can be done either at home or at a local shop that has the shape sensor. This means that each time customer 42 wants to buy a product, the shape sensor 52 may be used to measure his/her body size.

The communication line can be integrated services digital network (ISDN), which is able to transfer large amount of data efficiently. The integrated services digital network (ISDN) is described in U.S. Pat. No. 5,189,663, the disclosure of which is hereby incorporated by reference. In short, integrated services digital network (ISDN) is a relatively newly developed and emerging field of telecommunications which integrates computer and communication technologies to provide, worldwide, a common, all-digital network. This is based, in part, on standardizing the structure of digital protocols developed by the International Telegraph and Telephone Consultative Committee (CCITT) so that, despite implementation of multiple networks within national boundaries, from a user's point of view there is a single, uniformly accessible, worldwide network capable of handling a broad range of telephone, data and other conventional and enhanced services. According to a newsletter "The INSTITUTE" July/August Issue 1993, Volume 17, Number 4, published by The IEEE, Vice President Al Gore is aiming at building an information highway to channel multimedia broadband service to every home using optical fibers. The ISDN using the optical fibers is, thus, very useful to achieve the present invention.

Figure 2:
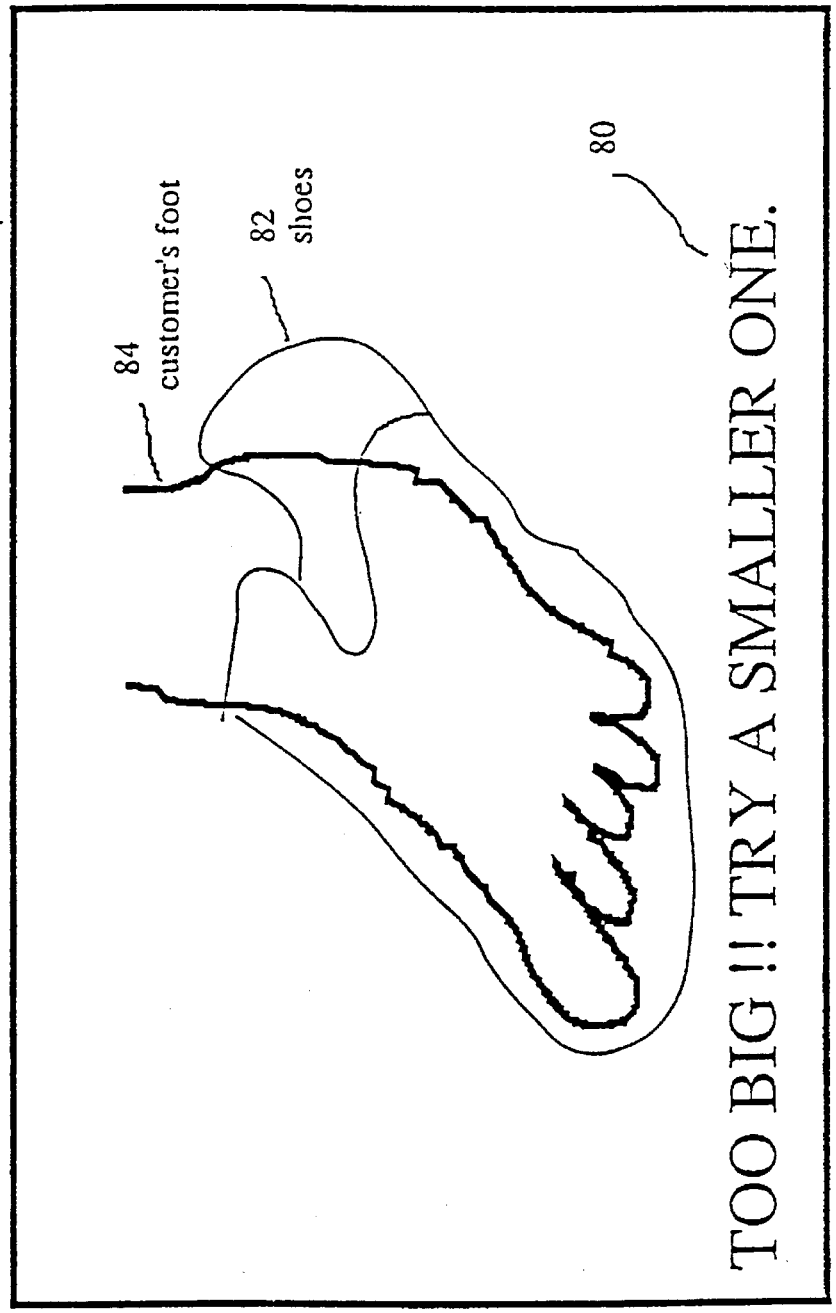
FIG. 2 is a picture example of the display monitor of FIG. 1.

FIG. 2 depicts a pictorial display on the display monitor of FIG. 1. In the picture frame 86, the shoes image 82 is superimposed on the customer's foot image 84 wherein the foot shape was measured by the shape sensor 52 in FIG. 1. This can be done by placing the three-dimensional shoes image 82 on the surface of the three-dimensional customer foot image 84. The customer can move the product image or the body image in any direction to check the fit. In addition, the customer can view the three-dimensional images from any directions. An alarm message 80 may appear on the bottom of the picture. This message is generated by processor unit 60. The processor unit 60 executes a program including an evaluation routine, outlined in FIGS. 7, 8, and 9, wherein a size comparison is performed in every dimension between the customer body and the product. The outer size of the shoes can be measured by a device similar to shape sensor 52 in a vendor site beforehand, while the inner size or shape of the shoes may be measured by an X-ray device. In FIG. 2, only inner dimensions of the shoes image are shown for simplicity. The remote computer can offer a possible best fitted shoes by referring the data base containing previous customers' selections, as described before.

Figure 3:
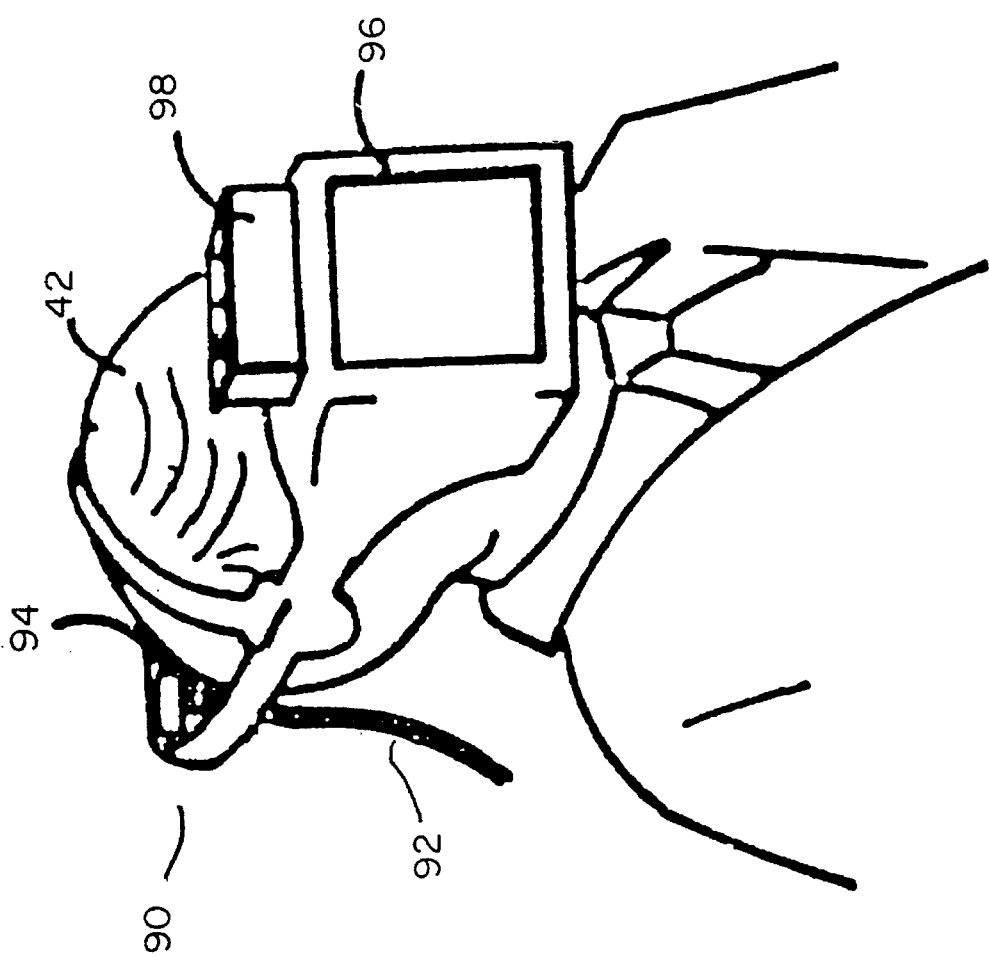
FIG. 3 illustrates a perspective view of the exterior of a head mounted display system worn by a customer, wherein the customer can view a three-dimensional stereoscopic image.

FIG. 3 illustrates a perspective view of the exterior of a head mounted display system 90 worn by customer 42. The customer detects fit of the product in view of his body image on the display. Alternatively, the local computer may evaluate the fit as described before. The head mounted display 90 is well known as a virtual reality display, and is described in detail in U.S. Pat. No. 5,130,794, the disclosure of which is hereby incorporated by reference. The head mounted display 90 can provide a stereoscopic view, which is easier for customer 42 to realize three-dimensional structure of the image displayed. In short, the image information is fed into a conventional portable fiat television display 98 via a signal transmission cable 92. An optical system is installed in a viewer box 96 which is connected to fiat television display 98, serving to project the displayed image on right and left eyes in a stereoscopic way. A position sensor 94 is mounted at the rear of the head mounted display system 90 so that the customer 42 can view the stereoscopic image from various view angles. In other words, by rotating the customer's head, customer 42 can view the images from different angles. This is useful because the product under consideration has a three-dimensional shape, and viewing from different angles helps decide the fit of the product. The head mounted display system is, for instance, manufactured by VPL Research Inc., California and the product names include Eye Phone LX and Eye Phone HRX. Another company, StereoGraphics Corporation, California, is making a different three-dimensional display system called CrystalEyes Video System which is essentially an electronic stereoscopic viewing device using liquid crystal shutters that are synchronized with a monitor display using wireless infrared signals. The CrystalEyes Video System rapidly directs an appropriate image to each eye. When the image for left eye is on the monitor screen, the left shutter for the left eye opens while the right shutter for the right eye closes, and vice versa. As a result, the viewer perceives a true flickerless stereoscopic image. More information is described in U.S. Pat. Nos. 4,418,993, 4,472,037, 4,523,226, 4,562,463, 4,583,117, 4,792,850, 4,884,876, 4,967,268, and 5,063,441, the disclosures of which are hereby incorporated by reference.

Figure 4:
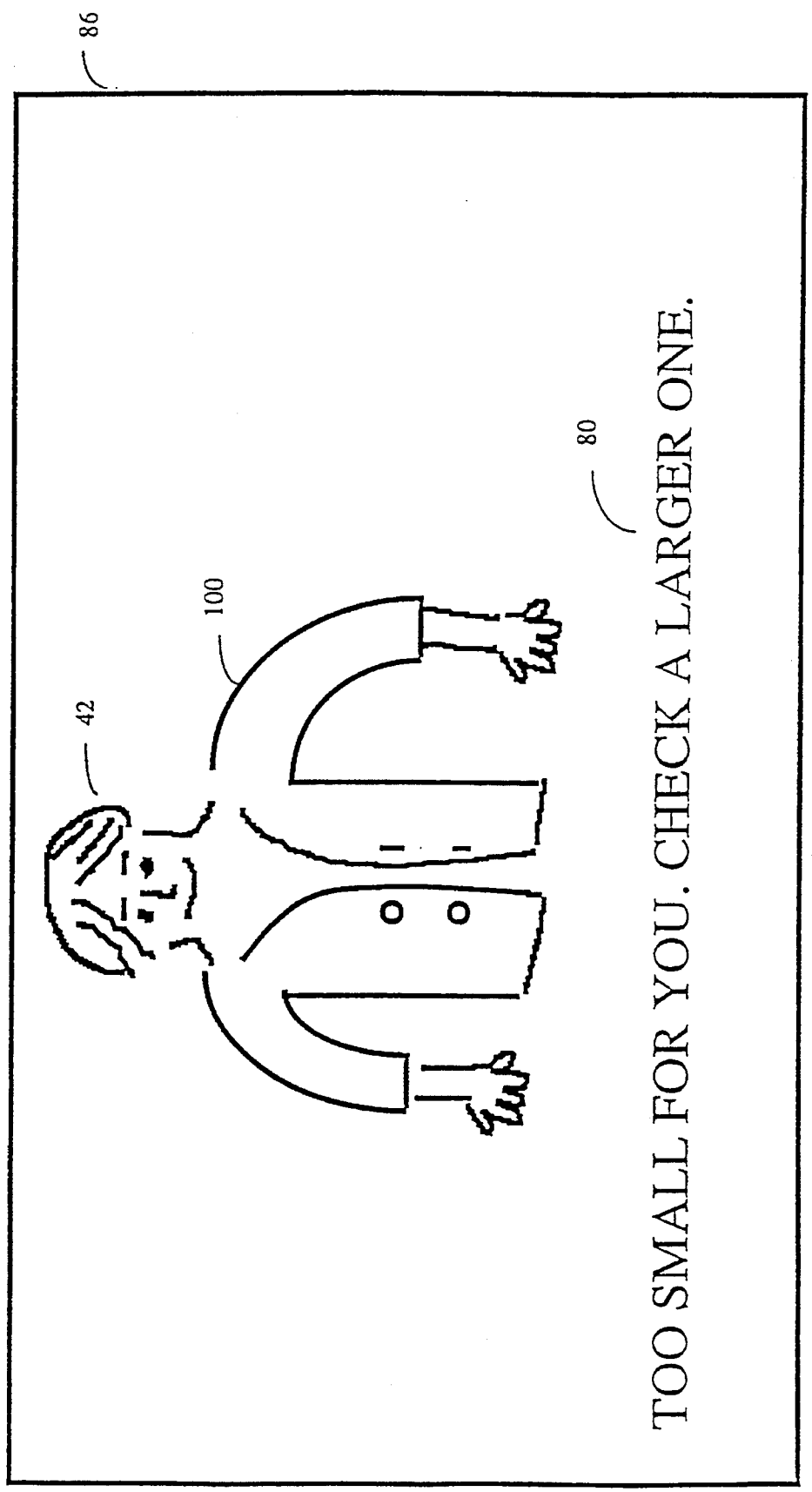
FIG. 4 is a picture example of the head mounted display of FIG. 3.

FIG. 4 shows a picture example of the head mounted display of FIG. 3, whereon the customer 42 wears a jacket 100. This can be done by placing the three-dimensional product image on the surface of the three-dimensional customer body image. In this case, the local computer 44 generates an alarm message 80; "Too Small For You. Check a Larger One." Again, this message is generated by an evaluation routine, wherein a size comparison is performed in every dimension between the customer body and the product. Alternatively or in addition, the customer can check the fit situation by viewing the picture.

Figure 5:
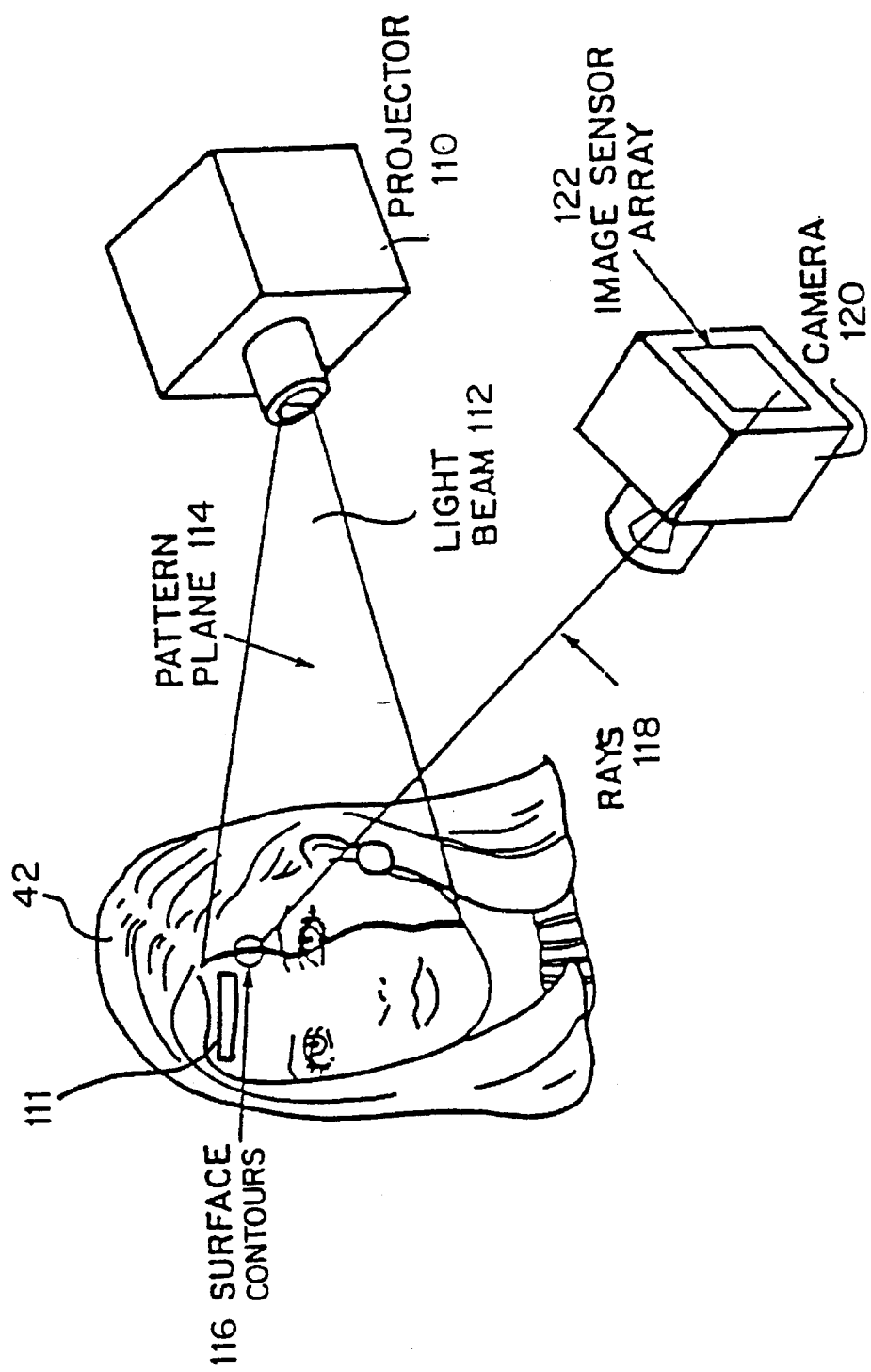
FIG. 5 is a diagram showing an optical shape sensor.

FIG. 5 shows an optical shape sensor for measuring a body shape. The detail of operation is described in U.S. Pat. No. 3,796,129, 3,690,242, 3,688,676, 4,846,577, and 4,871,256; the disclosures of which are hereby incorporated by reference. Simplified explanation is also appeared in Michael W. Vannier, et al, *Facial Surface Scanner*, IEEE Computer Graphics and Applications, p. 72–79, November issue, 1991. The three-dimensional surface scanner is, for example, manufactured by Cencit, St. Louis, Mo. as is described in the above IEEE article. A similar system "OGIS Range Finder RFX IV" is also manufactured by a Japanese company OGIS, Japan. In brief, a light beam 112 having a predetermined pattern of light 114 is projected onto the customer 42. An image sensor array 122 in a camera 120 views the light on the surface of customer 42. Processor unit 60 in FIG. 1, connected to the shape sensor, determines positions of contours 116 on the customer's surface by solving for the intersections of the known projected pattern 114 and the rays 118 passing through the lens of the imaging sensor 122 onto its imaging plane. Knowing the positions, orientations, and other parameters of the projector 110 and imaging sensor 122 and observing the imaged intersection of the projected pattern with the customer's surface, we can calculate the three-dimensional shape of the customer body. To obtain a full three-dimensional shape image, the customer may change his/her viewed angle by sitting on a rotating chair or standing a rotating plate. Alternatively, a plurality of projectors 110 and cameras 120 may be placed around the customer 42. Using the above conventional shape sensor, we only know relative dimension of the customer body. Therefore, a reference scale must be placed on the body surface in order to know the absolute dimension of the customer body. This can be done by providing a tape with adhesive on the reverse side and a printed measurement scale of centimeter unit or inch unit on the front side. Alternatively, a plastic film tape 111 of a known length can be used for this calibration, shown in FIG. 5.

Figure 6:
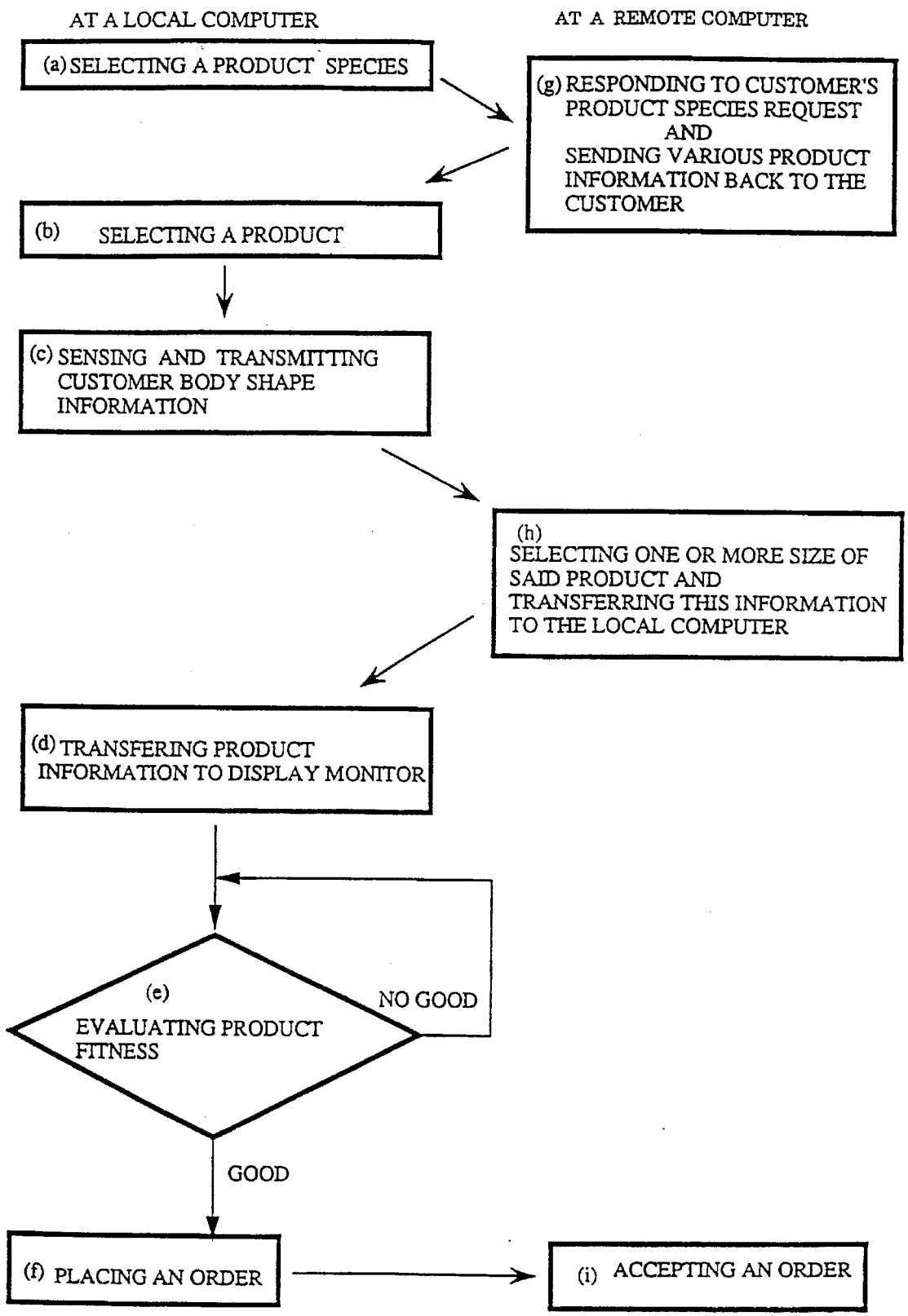
FIG. 6 is a flow diagram illustrating the ordering method in accordance with the present invention. This diagram corresponds to the ordering system shown in FIG. 1.

FIG. 6 is a flow diagram illustrating the ordering method at a local and a remote computer system in accordance with the present invention. The diagram corresponds to the ordering system shown in FIG. 1.

The operation of the ordering system in FIG. 1 is described hereinafter by referring FIGS. 1, 2, 3, and 6. At local computer system 44, customer 42 first selects a product species in a step (a) of FIG. 6; for example, let us assume the customer selects shoes. He/she types a word "shoes" using keyboard 56 and the term appears on display monitor 54. Via processor unit 60, communication device 48, and communication line 46, the product species information is transferred to the remote computer system 40. Then remote computer 40 responds to the "shoes" requests, sending various shoes product information including shape, color, and price information back to customer 42 in a step (g). Subsequently, the customer selects a particular product in a step (b) such as A company's B model, brown color; then, local computer 44 detects customer body size that corresponds to the particular product by using shape sensor 52 and transfers this size information to remote computer 40 in a step (c). For example, only foot size is measured when buying shoes. Next, remote computer 40 selects one or more size of shoes and transfers this information to local computer 44 in a step (h). The local computer 44 then transfers that product image information to the display monitor 54 of local computer 44 in a step (d). On the display monitor, the product image is superimposed on the customer body image so that customer 42 can realize the fit of the product in contrast to the customer's body, shown in FIG. 2. The display monitor can be an ordinary display or the head mounted display illustrated in FIG. 3. Either the customer or the local computer can evaluate the product fit in a step (e). The local computer 44 compares the product dimension with the customer dimension in each aspect, and displays the evaluation result. An example was shown in FIG. 2 and described previously. If the customer finally decides that the product may not be best fitted, he/she requests another product information to the remote computer 40. When the customer meets the best fitted product, he/she is placing an order in a step (fi toward the remote computer 40. The remote computer accepts the order at a final step (i). The order of the above steps can be altered if that leads to the same result.

Figure 7:
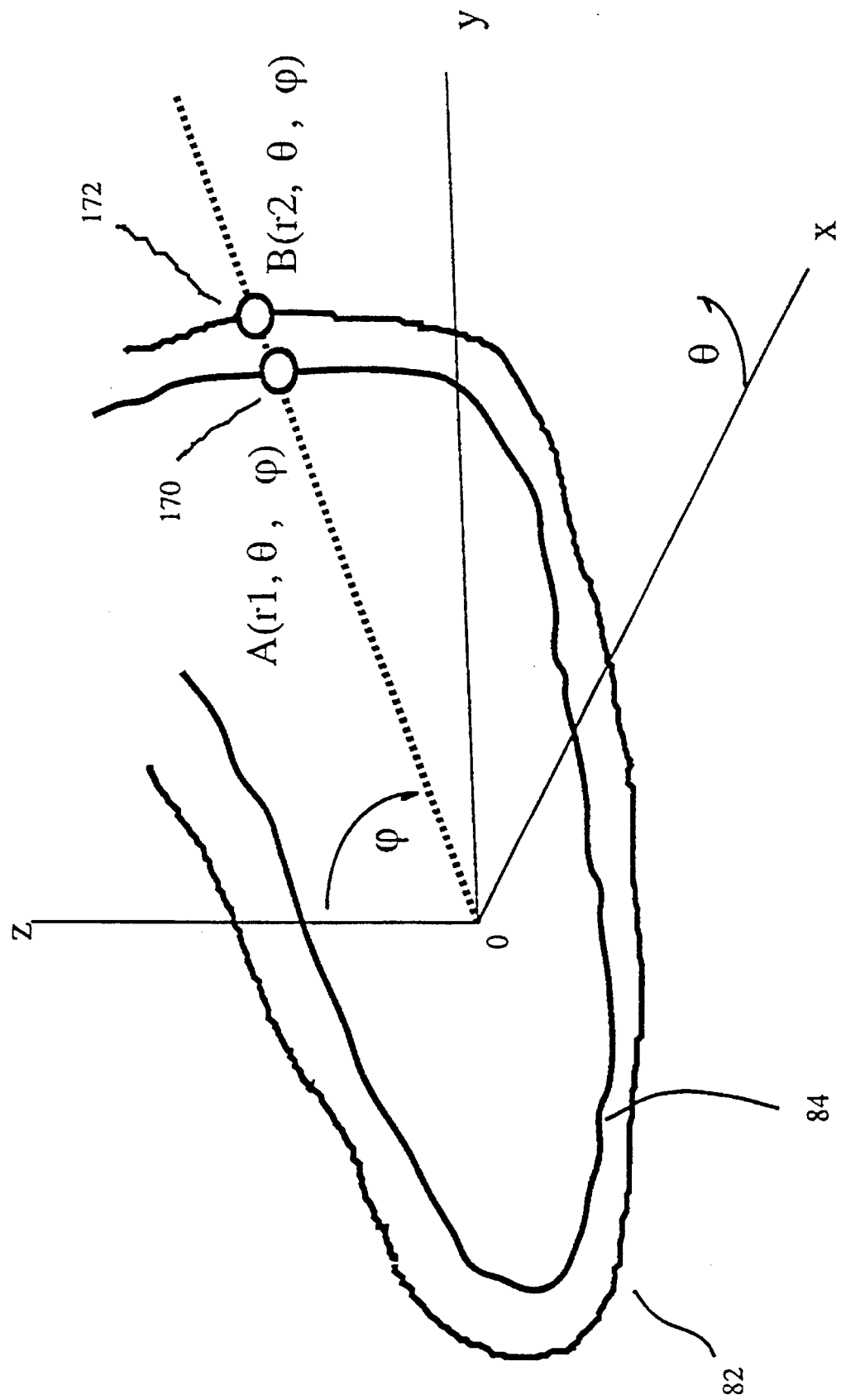
FIG. 7 is a diagram explaining automatic evaluation of a product fit in case of shoes.
Figure 8:
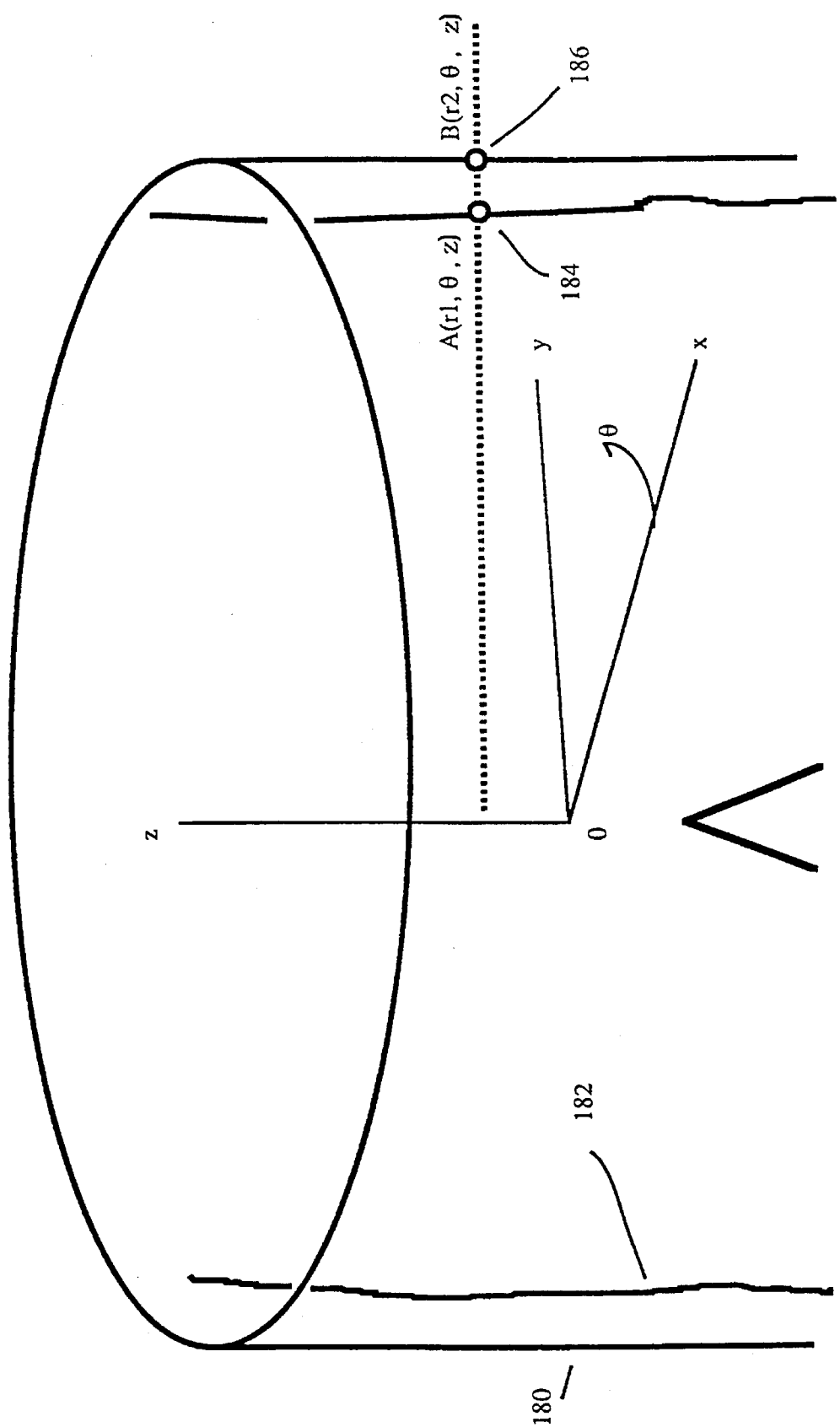
FIG. 8 is another diagram explaining how to evaluate a product fit on a customer body in case of pants.
Figure 9:
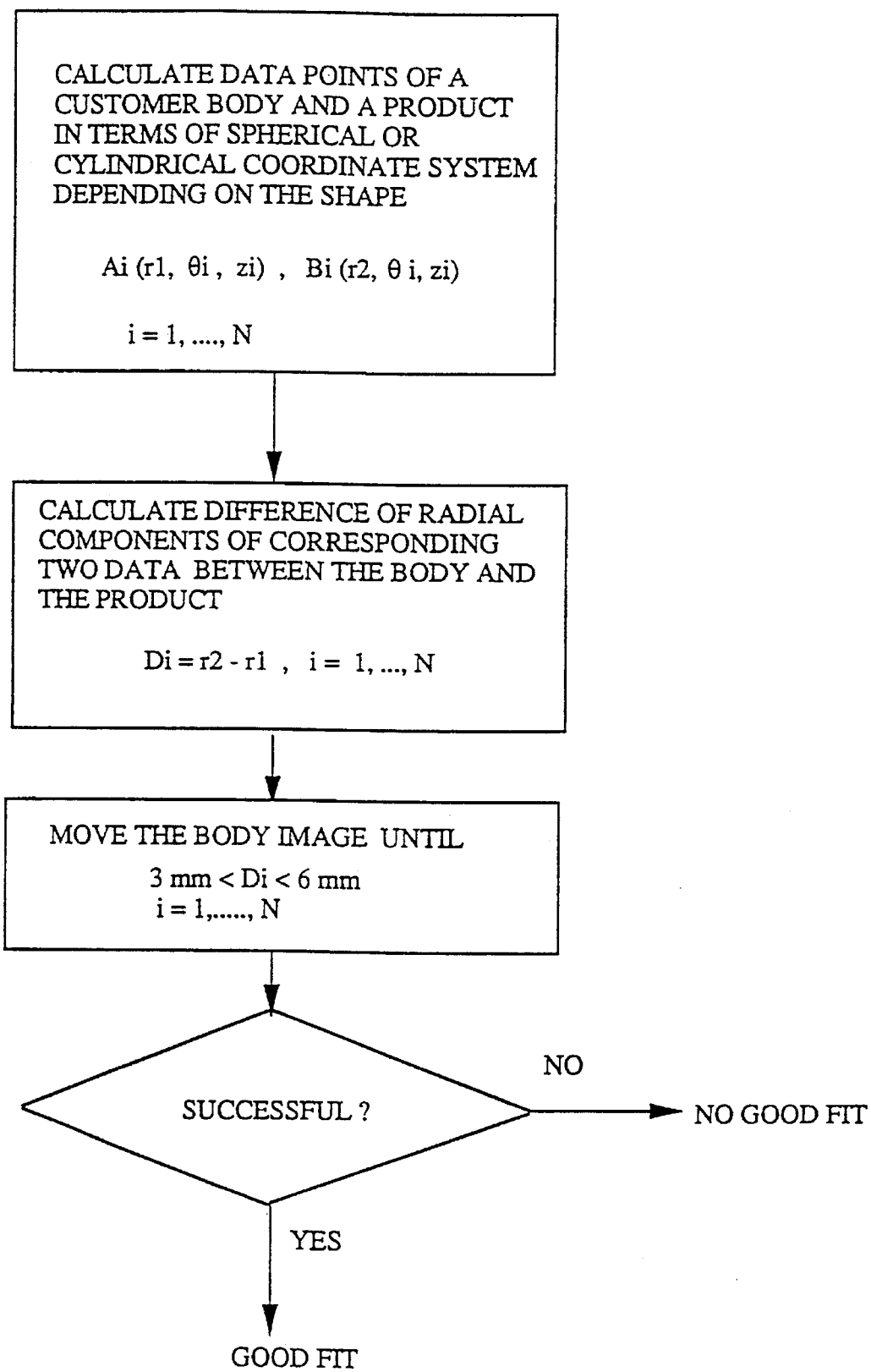
FIG. 9 is a flow diagram illustrating an evaluation routine of the product fit.

Details of the automatic evaluation is described here using FIGS. 7, 8, and 9. FIG. 7 is a diagram indicating three-dimensional data of the inner-side shoes image 82 and the customer foot image 84. The data consist of many discrete points including a foot data point 170 denoting $A(r1, \theta, \phi)$ and a shoes data point 172 denoting $B(r2, \theta, \phi)$ in terms of spherical coordinate system. Note that the two points have identical $\theta$ and $\phi$ angular components and only the radial components are different which are to be compared.

FIG. 8 is another diagram indicating three-dimensional data of the inner-side pants image 180 and the customer body image 182. Again, the data consist of many discrete points including a body data point 184 denoting $A(r1, \theta, z)$ and a pants data point 186 denoting $B(r2, \theta, z)$ in terms of cylindrical coordinate system. Again, the two points have identical $\theta$ and $z$ components and only the radial components are different which are to be compared. One of the two coordinate system is selected depending on the shape under evaluation.

FIG. 9 is a flow diagram illustrating an example of the evaluation routine of the product fit. In case of using cylindrical coordinate system, the routine comprises the steps of:

(1) calculating data points of a customer body and a product image denoting $Ai(r1, \theta i, zi)$ and $Bi(r2, \theta i, zi)$ wherein a spatial parameter i varies from 1 to N, and N is an appropriate integer such as 1000;

(2) calculating the difference of radial component, r1 and r2, of corresponding data between the body and the product, and defining the value Di as r2–r1, wherein the spatial parameter i varies from 1 to N;

(3) moving the body image until Di ranges between appropriate values such as between 3 mm and 6 mm;

(4) checking if this has been successfully done; and (5) concluding good fit if the result was successful, and no good fit if that was not successful.

Again, the above evaluation routine is an example of fit evaluation methods. Other routines may be used to achieve various size comparison. For instance, when buying pants or jackets, the length of the product and the body must be compared as well.

Figure 10:
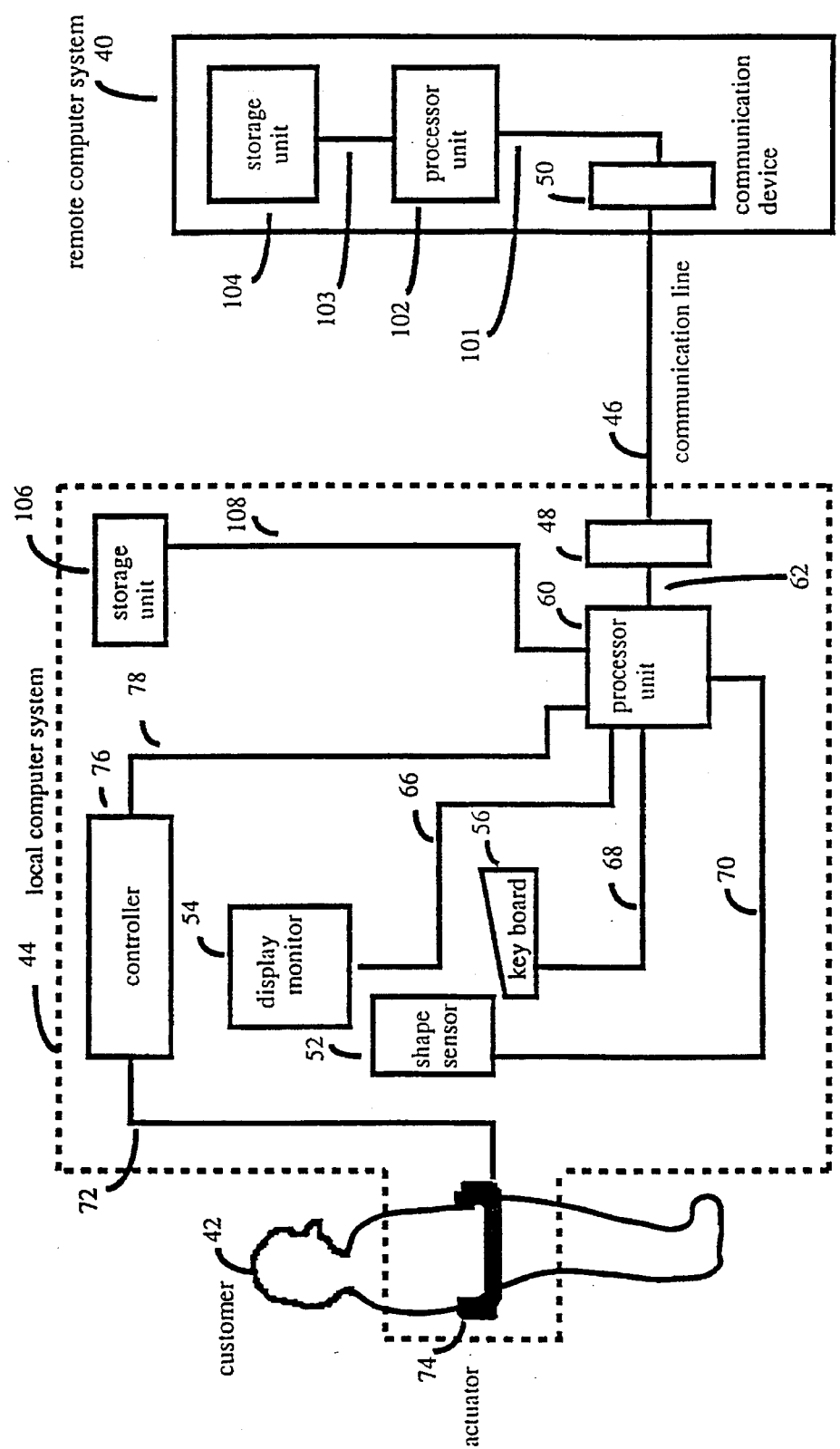
FIG. 10 is another block diagram illustrating the ordering system in accordance with the present invention, wherein an actuator is attached on a customer body.

In accordance with another embodiment of the invention shown in FIG. 10, an actuator 74, a controller 76, and signal lines 72 and 78 are employed in the local computer system 44. Other configuration is nearly the same as the previous embodiment in FIG. 1, and thus only the local computer system 44 is described herein. All the aspects described in the previous embodiment may be applied in FIG. 10 as well.

The local computer system 44 comprises a conventional communication device 48 coupled to communication line 46 for exchanging the information, a shape sensor 52 for detecting the customer's size information, an actuator 74 for teaching the product size information directly to the customer's body, a controller 76 that controls actuator 74 via a control line 72, a display monitor 54 on which the customer body image and the product image are displayed, a keyboard 56 for inputting product-related and customer-related information, a conventional storage unit 106 for storing at least customer information, and a conventional processor unit 60 being connected to shape sensor 52, display monitor 54, keyboard 56, communication device 48, storage unit 106, and controller 76 via connection lines 70, 66, 68, 62, 108, and 78 respectively; and thus controls the whole local computer system 44. The controller 76 can be a conventional servo controller.

Figure 11:
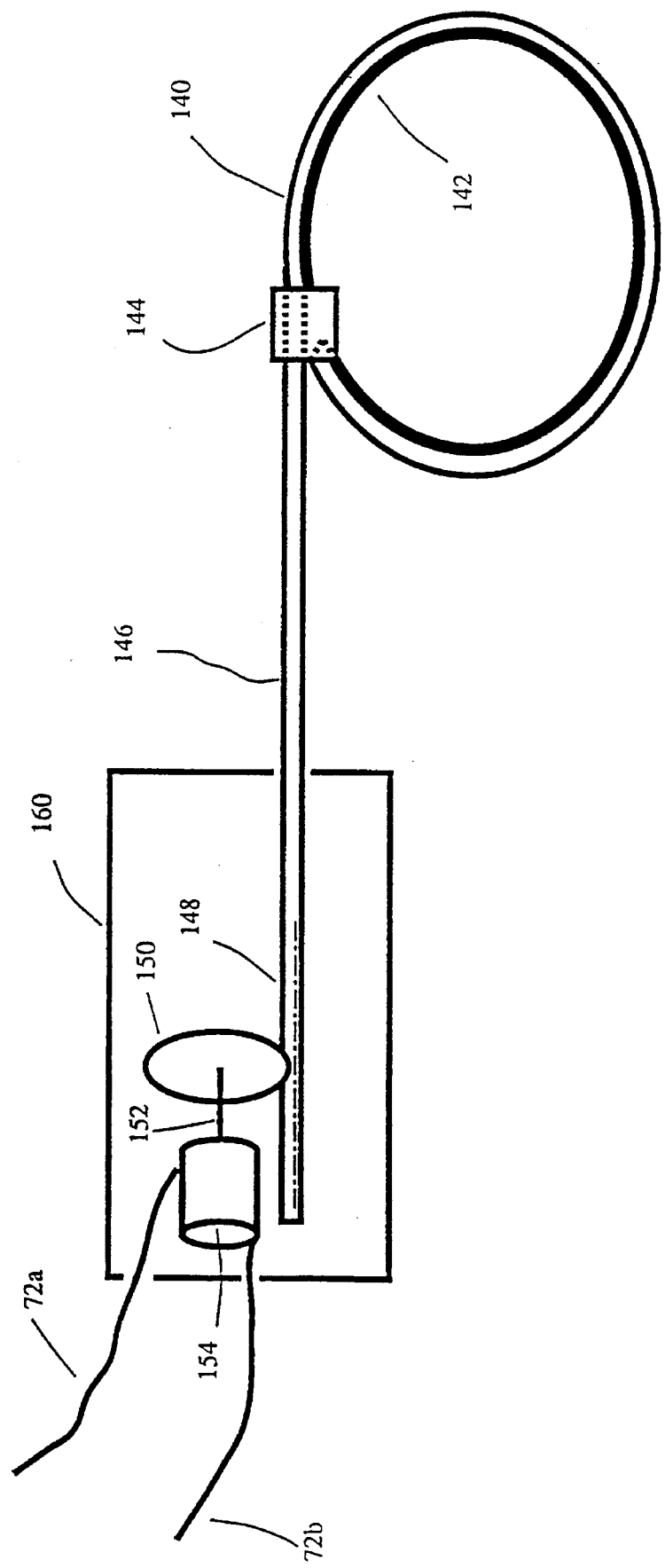
FIG. 11 is a schematic diagram showing a type of actuator.

A type of actuator 74 is schematically shown in FIG. 11, wherein a loop 140 is attached onto a customer body surface.

The loop 140 may be a plastic belt whose inner surface is covered by a rubber band 142. This gives more comfortable feeling to the customer. One end of the belt 140 is fixed at a holder 144, and the other side of the loop 140 is running through a hole of holder 144 and an extended part 146 of the other side of the loop 140 extends into a motor box 160. In the motor box 160, a further extended portion 148 of the loop is shaped as a rack or a bar with teeth that mesh with teeth of a conventional gearwheel 150. Gearwheel 150 is connected to a conventional servomotor unit 154 through a conventional shah 152. A control cable 72a transmits control signal from the controller 76 in FIG. 10 to the servomotor unit 154, while another cable 72b transmits motor rotating angle information from a conventional position detector (not shown) included in the servomotor unit 154 to the controller 76 in FIG. 10. At an initial setting-up of the actuator, the customer places the actuator loop 140 on a target body part. By measuring the body size of the target part using the shape sensor 52, processor 60 can easily calibrate the actuator. After the calibration, the processor 60 knows the relationship between the motor angle and the loop circumferential length that is servo-controlled. Because the motor angle corresponds to the length of the loop circumference over the customer body, this configuration provides an actuator means for teaching a product size to the customer.

Figure 12:
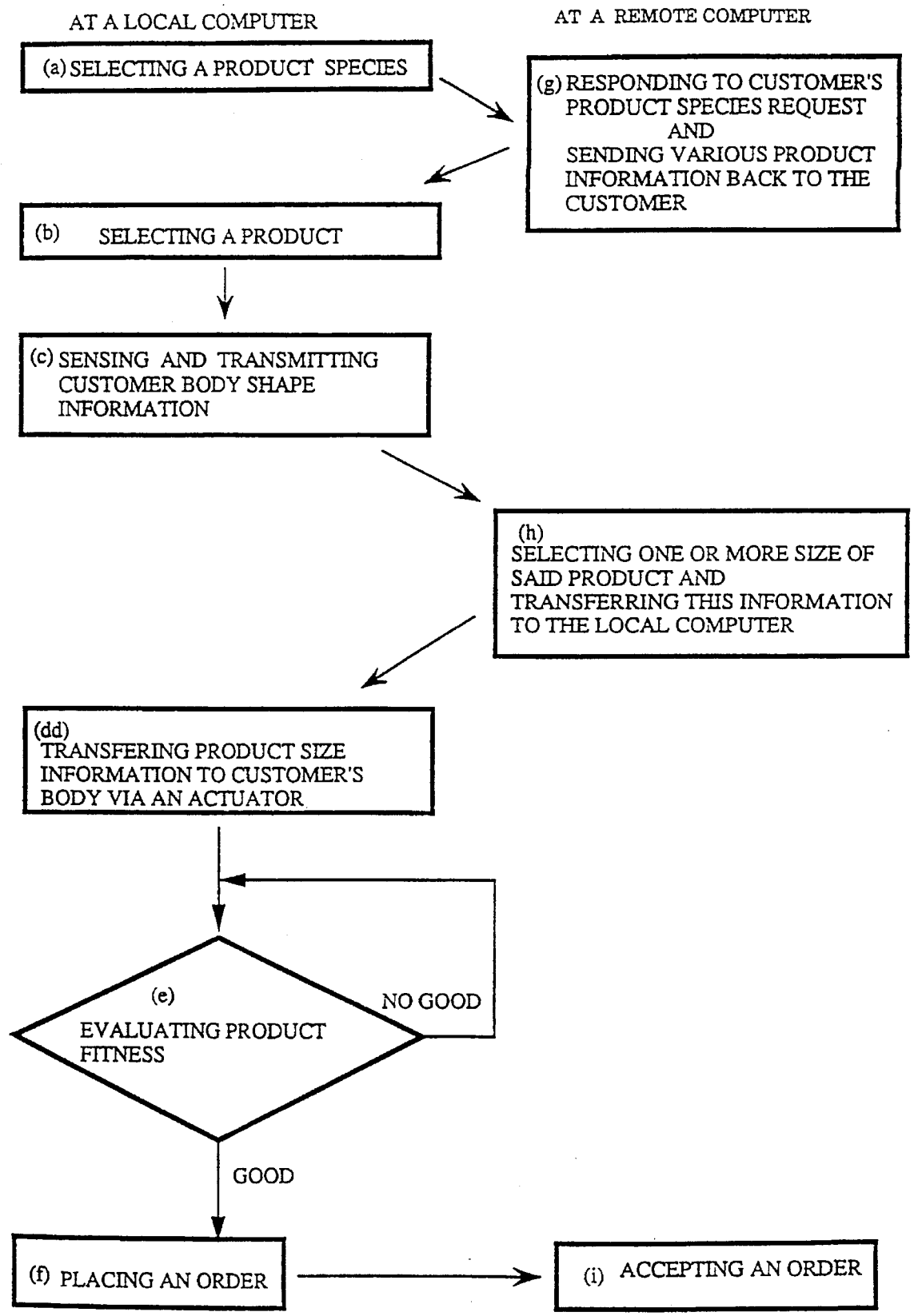
FIG. 12 is another flow diagram illustrating the ordering method in accordance with the present invention. The figure relates to the ordering system shown in FIG. 10.

FIG. 12 is a flow diagram illustrating the ordering method at a local and a remote computer system in accordance with the present invention. The diagram corresponds to the ordering system shown in FIG. 10.

Operation of the embodiment of FIG. 10 is explained using FIG. 12. Because there are many operating steps identical to FIG. 6, only different steps from the previous embodiment in FIG. 6 are described here. In a step (dd) of FIG. 12, the remote computer 40 sends the product size information to the customer body via actuator 74 in the local computer 44. In FIG. 10, the actuator is placed on a waist part of the customer, wherein the customer is aiming at checking a waist size of trousers or pants. As described in FIG. 11, the actuator operates until the loop size equals a corresponding product dimension. This operation utilizes a typical servo control or feedback control configuration that is well known. This function may be particularly useful for selecting one of two products of slightly different size. Again, other system configuration and method for this embodiment are identical to the previous embodiment, thus the description is omitted.

Figure 13:
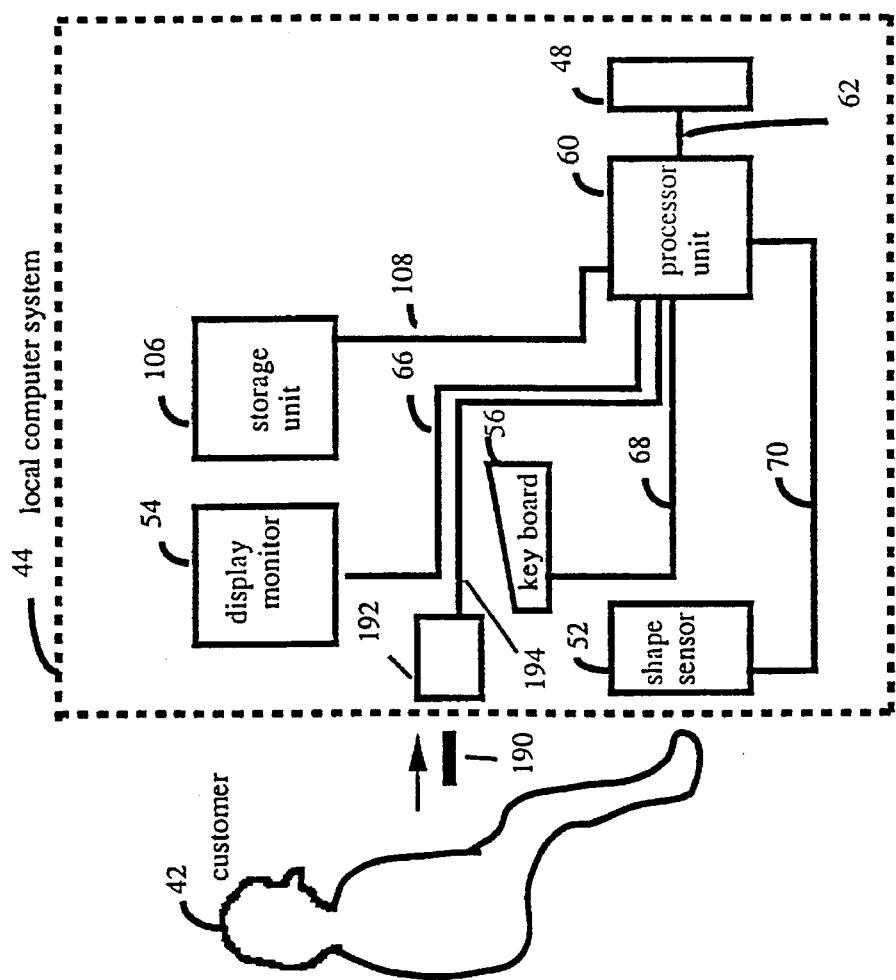
FIG. 13 is still another block diagram illustrating another type of ordering system in accordance with the present invention.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein. For example, this invention may help ordering made-to-order products such as shoes that is made to order. Another example is to use this invention when a customer wants to figure out fit of combinations of products, such as fit of shirts and pants. One can also check if one's owning pants are suitable to a particular product like a shirt under consideration. A conventional catalogue or brochure may be also employed for this invention as an optional item. Still other example is to utilize this invention in a single vendor site, meaning that everything is achieved in a local computer system 44 at a vendor site as shown in FIG. 13. In FIG. 13, a compact storage device 190, such as an LSI card, may be used to tell a customer's body size to the computer 44. A storage device interface unit 192 can read or write the customer's body size information. When writing the information, the shape sensor 52 is engaged to measure the body size. The storage device interface unit 192 is connected to processor unit 60 via a signal cable 194. Other configuration and operation are the same as the previous embodiments, and therefore further description is omitted.

What is claimed is:

1. Apparatus for ordering products, comprising:

a data base storing previously obtained a plurality of customers' size information and product information including product description and size;

an input device for receiving size information from a current customer;

a processor coupled to said input device and said data base and programmed to correlate said current customer size information with said previously obtained customers' size information and product information stored in said data base;

means for displaying a product selection based on said correlation; and an actuator means for transferring product information to the customer.

2. Apparatus for ordering products, comprising:

a shape sensor for detecting a prescribed size of a customer and providing customer size information;

a memory storing product size information relating to an inventory of products available for sale to customers;

a processor for comparing said customer and product size information and displaying product selection information; and an actuator means for transferring the product size information to the customer.

3. Apparatus for assessing the fit of wearing apparel, such as shoes or clothing, comprising:

a shape sensor for detecting a prescribed size of a customer and providing customer size information;

a memory storing product size information relating to an inventory of products available for sale to customers;

a processor for developing an image corresponding to a particular wearing apparel based on said product size information stored in said memory, and superimposing said image on an image of a body part of a customer derived from said shape sensor; and an actuator means for transferring the product size information to the customer.

4. Apparatus for assessing the fit of wearing apparel, such as shoes or clothing, comprising:

means for storing information on a prescribed size of a customer;

a memory storing product size information relating to an inventory of products available for sale to customers;

a processor for developing a first image derived from said information storing means and a second image derived from said memory and superimposing said first and second images; and an actuator means for transferring the product size information to the customer.

5. The apparatus of claim 4, wherein said means for storing information includes a data storage card.

6. The apparatus of claim 4, wherein said means for storing information and said memory is a common data storage medium.

7. A system for ordering products, comprising:

a remote computer system comprising a communication means coupled to a communication line which connects said remote computer system and a local computer system for exchanging customer and product information, a storage means for storing at least the product information, and a processor means for at least controlling said remote computer system;

said local computer system comprising a communication means coupled to said communication line which connects said local computer system and said remote computer system, a sensor means for detecting said customer information, an output device means including an actuator means for transferring product information to said customer, an input device means for inputting information, a storage means for at least storing customer information, and a processor means for at least controlling said local computer system.

8. The system of claim 7, wherein said product information includes size of said product.

9. The system of claim 7, wherein said customer information includes body size of said customer.

10. The system of claim 7, wherein said sensor means includes a three-dimensional digitizer.

11. The system of claim 10, wherein said three-dimensional digitizer includes an optical shape sensor.

12. The system of claim 7, wherein said output device means includes a monitor display.

13. The system of claim 7, wherein said output device means includes a head mounted display.

14. The system of claim 7, wherein said input device means includes a key board.

15. A system for ordering products, comprising:

a remote computer system comprising a communication device coupled to a communication line which connects said remote computer system and a local computer system for exchanging customers' information and product information, a storage unit for storing at least the product information, and a processor unit for controlling said remote computer system;

said local computer system comprising a communication device coupled to said communication line which connects said local computer system and said remote computer system, a shape sensor for detecting said customer's body size information, a monitor display for transferring product image and customer body image to said customer, a keyboard for inputting information, a storage unit for at least storing customer information, a processor unit for controlling said local computer system, and an actuator means for transferring the product information to the customer.

16. A method of ordering products, comprising the steps of:

at a local computer system, (a) selecting a product species from a product list transmitted by a remote computer system;

(b) selecting a product from said selected product species;

(c) transmitting customer information using a sensor means toward a remote computer system in order to select a size of said product;

(d) transferring the product information to an output device means which includes an actuator means;

(e) evaluating the product fit;

(f) placing an order; and at a remote computer system, (g) responding to customer's product species request and sending various product information back to the customer.

17. The method of claim 16 wherein the steps are interactively processed in the following order: (a), (g), (b), (c), (h), (d), (e), (f), and (i).

18. The method of claim 16 wherein said product information includes size of said product.

19. The method of claim 16, wherein said customer information includes body size of said customer.

20. The method of claim 16, wherein said sensor means includes a three-dimensional digitizer.

21. The method of claim 20, wherein said three-dimensional digitizer includes an optical shape sensor.

22. The method of claim 16, wherein said output device means includes a monitor display.

23. The method of claim 16, wherein said output device means includes a head mounted display.

24. Apparatus for ordering products, comprising:

a data base storing customer information and product information including product description and size;

an input device for inputting product species information being considered;

a processor coupled to said input device and said data base and programmed to correlate said customer information with product information stored in said data base;

means for displaying a product selection based on said correlation; and an actuator means for transferring the product information to the customer.

25. The apparatus of claim 24, wherein said customer information includes customer body size information and customer preferences information.

26. The apparatus of claim 24 wherein the customer preferences information includes at least one of product color and product design.

27. Apparatus for ordering products, comprising:

a data base storing previously obtained current customer size information and product information including product description and size;

a processor coupled to said data base and programmed to correlate said current customer size information with product information stored in said data base;

means for displaying a product selection based on said correlation; and an actuator means for transferring the product information to the customer.

* * * * *